United States Patent [19]

Lüdemann et al.

[11] Patent Number: 4,895,927

[45] Date of Patent: Jan. 23, 1990

[54] WATER SOLUBLE, SELF-CROSSLINKING, POLYMERIC CONDENSATION PRODUCT OF AMINO (METH) ACRYLATE AND PHOSPONIC ACID ESTER

[75] Inventors: Simpert Lüdemann, Bobingen; Michael Bernheim, Aystetten, both of Fed. Rep. of Germany

[73] Assignee: Ciba-Geigy Corporation, Ardsley, N.Y.

[21] Appl. No.: 172,878

[22] Filed: Mar. 25, 1988

[30] Foreign Application Priority Data

Apr. 2, 1987 [DE] Fed. Rep. of Germany ....... 3711092

[51] Int. Cl.$^4$ ............................................. C08G 83/00
[52] U.S. Cl. .................................. 528/321; 428/411.1; 524/606; 524/608; 528/310; 528/392; 528/398
[58] Field of Search ............... 528/321, 310, 392, 398; 524/606, 608

[56] References Cited

U.S. PATENT DOCUMENTS 3,763,108 10/1973 Chang et al. .......................... 260/72
4,239,876 12/1980 Arndt et al. ......................... 526/287

FOREIGN PATENT DOCUMENTS 1552798 9/1979 United Kingdom .

OTHER PUBLICATIONS

C.A. 105 (22): 191641d.
C.A. of JP 7315471 (1969).
C.A. of SU 390–108 (1971).
C.A. of SU 319,613 (1969).

Primary Examiner—Harold D. Anderson
Attorney, Agent, or Firm—Kevin T. Mansfield; Edward McC. Roberts

[57] ABSTRACT

The present invention contains a process for manufacturing a water-soluble, self-crosslinking, polymeric condensation product by reacting 1 mole di-$C_{1-4}$-alkylamino-$C_{2-4}$alkyl(meth)acrylates with 0.3 to 1.5 mol di-$C_{1-3}$-alkyl-phosphonates in the presence of water under heating up to a remarkable increase of the viscosity.

If aqueous solutions of these condensation products are used for the treatment of fibrous materials, a very high antistatic effect is imparted to them with only small changes of shade and a very good dry- and wet rubbing fastness as well as water-fastness. The effects show a good permanency.

27 Claims, No Drawings

WATER SOLUBLE, SELF-CROSSLINKING, POLYMERIC CONDENSATION PRODUCT OF AMINO (METH) ACRYLATE AND PHOSPONIC ACID ESTER

The invention concerns a water-soluble, self-crosslinking, polymeric condensation product suitable for treating fibrous materials.

It is known that the alkylation of tertiary amines with alkyl halides or dimethylsulphate requires a polar solvent (Ullmann 22, P. 496 (1982). Moreover it is known that a spontaneous polymerisation takes place when dimethyl- or diethylaminoethylmethacrylate is alkylated with ethylbromide or dimethylsulphate in aqueous solution in the presence of a polar solvent, in addition to the expected alkylation. In this way water-soluble products are obtained (A. S. Maksumova et al.; report C.A. 105 (22): 191641 d), which do not have any self-crosslinking properties. Furthermore it is known that during the quaternisation of the mentioned methacrylates and also of the acrylates even in the presence of only a small quantity of water hydrolysis-products (EP-PS 11 116) result to a great extent, and therefore such alkylations are carried out in the absence of water.

Now it has been found that water-soluble, self-crosslinking, polymeric condensation products can be manufactured in a very simple manner, if there are reacted dialkylaminoalkyl(meth)acrylates with dialkyl-alkanephosphonates in aqueous solution possibly containing a solvent, during increasing viscosity. The obtained products are water-soluble, but they can be transferred to the insoluble state by heating. Therefore the present invention describes a process for manufacturing a water-soluble, self-crosslinking, polymeric condensation product as it is described in a more detailed manner in claim 1 and in claims 2 to 11. Aqueous solutions of these condensation products and their utilization are protected in claims 12 and 13.

It is extremely surprising, that water-soluble, polymeric condensation products with valuable properties can reproducibly be manufactured in spite of the presence of water and the hydrolysis involved and in spite of the spontaneous —and after all uncontrolled—polymerisation. Contrary to the known polymerisates these products can be cured by simple heating and supply good antistatic effects when applied on textiles, without any negative influence on the fastness of the dyestuff to rubbing and water. Besides, these effects are—and this is also a considerable difference to the prior art—very well fast to washing and even to drycleaning.

As compounds of the formula (I)

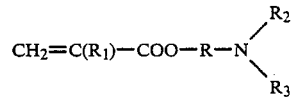

in which R=alkylene with 2 to 4 C-atoms, $R_1$=H or methyl, $R_2$ or $R_3$ mean independently of each other an alkyl residue with 1 to 4 C-atoms, especially dimethylaminoethyl(meth)acrylates are used. Of course such compounds are suitable in which R means e.g. the propyl residue or $R_2$ resp. $R_3$ ethyl or i-propyl resp. butyl. As such compounds dimethylaminopropylmethacrylate, diisopropylaminoethylmethacrylate, diethylaminoethylacrylate and dimethylaminopropylacrylate are to be mentioned. Generally mixtures of the compounds of the formula (I) are used. It is quite possible that up to 100 mole%, especially up to 50 mole% of these products can be used in form of their hydrolysis products, i.e. normally a mixture of the unsaturated acid and the dialkylamino alcohol. If the portion of the hydrolysis products is predominant summa summarum anionic reaction products result, and, therefore, preferably only up to 50 mole% of compounds (I) are used in hydrolized form.

The phosphonic acid esters of formula (II)

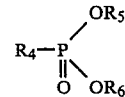

($R_4$, $R_5$, $R_6$ mean independently of each other an alkyl residue with 1 to 3 C-atoms) are generally known.

So one skilled in the art will select the suitable compounds himself and it stands to reason that the shortchain ester derivatives, i.e. for example dimethylmethanephosphonate or dimethylpropanephosphonate will preferably be used, but diisopropylmethanephosphonate is also well suitable.

The compounds of formula (I) and (II) are reacted in a ratio of 1 mole to 0.3 to 1.5 mole. A ratio of 1 mole of compound of formula (I) to 0.8 to 1.2 mole of formula (II) is particularly preferred.

For manufacturing water-soluble, self-crosslinking, polymeric condensation products the compounds of the formulae (I) and (II) are brought to reaction in the indicated ratio in the presence of water under heating. It is also advantageous, if the water is partially (maximum 65%), replaced by a solvent, especially a polar solvent. As polar solvents are least partly water-soluble, monovalent alcohols with 1 to 4 C-atoms come into consideration. But also bi- or polyvalent alcohols and/or their mono-, di- or polyalkyl esters with a molecular weight of at least 70 to about 200 are used. One skilled in the art knows these compounds such as e.g. ethanol, 1,2-propylene glycol, ethyl glycol and will not have any difficulties in selecting corresponding compounds. Besides, alkyl-substituted benzenes, e.g. toluene, are also suitable as solvents.

For the reaction it is essential that the weight ratio of the sum of water and solvent to the sum of the compounds of formula (I) and (II) is, at the beginning of the reaction, at least 1:1. It is a special advantage if the solvent mixture consists to one fifth to about one half of the solvent. The upper limit of the sum of water and solvent possibly used is not limited, but one skilled in the art will take care that the end products are not too diluted, therefore, for practical reasons the upper limit is at a ratio of about 1:10.

If the compounds of formulae (I) and (II) are heated in the presence of water and possible solvents, an increase of the viscosity takes place caused by progressive polymerisation. The lower limit for this viscosity is not critical, but in general one can say that the end point of the reaction is reached if the viscosity has risen to 500 mPa.s, referring to an approx. 40 to 50% solution of the product. Simultaneously with the increase of viscosity a decrease of the pH-value is observed.

The reaction has to proceed until practically all double bonds have disappeared, i.e. the higher the final viscosity is, the more probable it is that the mixture has well reacted. Therefore, the reaction is preferably brought up to a viscosity of 1000 to 6000 mPa.s (at room temperature). Certain quantities of double-bonds, however, can still be present in the reaction mixture and, therefore, the reaction is completed by heating for a short time after the addition of a common polymerisation initiator, e.g. sodium persulphate.

More details for manufacturing the water-soluble, self-crosslinking, polymeric condensation products can be gathered from the examples.

The condensation products thus manufactured are distributed in the form of aqueous solutions, these solutions being adjusted to a solids content of about 10 to 50%.

The condensation products manufactured as described above resp. their aqueous solutions are used for the treatment of fibrous materials. The treated materials are especially distinguished by the fact that electrostatic charge is prevented to a large extent, the degree of whiteness being very well maintained and also shade changes being largely avoided. As a special advantage the high fastness to water must be pointed out and the remarkably improved fastness to dry and wet rubbing compared with the prior art. As fibrous materials especially synthetic materials come into consideration, above all polyester in the form of knitwear or woven fabrics, but also polyamide textiles and all such materials with which the static change is a problem and, therefore, should be avoided.

The treatment itself is effected in a simple manner by diluting the condensation product solution with water (quantities 1 to 50 g/l solid substance), then applying it to the material in the known manner and completing the finish by drying and subsequent condensation at temperatures of about 120° to 200° C.

The textiles thus finished show remarkably improved properties compared with the prior art and it must yet be pointed out that a very high washing and dry cleaning permanence of these effects is guaranteed. These improvements are, indeed, surprising, since the prior art has already reached a considerable standard.

The invention is described in detail by the following examples, the %-indications are % by weight.
Raw materials:
 28.6 g dimethylaminoethylacrylate,
 125.8 g dimethylaminoethylmethacrylate,
 124.0 g dimethylmethanephosphonate,
 50.0 g ethanol
(A) 230.0 g $H_2O$
(B) 370.0 g $H_2O$ as diluting water Water (quantity A) and ethanol are charged, the acrylates and the phosphonate are added under stirring (pH-value about 9, 7) and then heated under reflux (92° C.). The reactants are kept under reflux until a viscosity of 3500 to 4500 mPa.s (at 20° C.) is reached (about 3.5 to 4 hours), while the pH-value drops to 6.2. Then some more water is added (quantity B) and a temperature of 60° C. is adjusted. For completing the reaction 6 ml 25% $Na_2S_2O_8$-solution are added, the reaction mixture kept at 60° C. for 15 minutes (slight or no reaction), heated to 80° C., kept at this temperature for 1 hour, cooled down and filtered. The obtained approx. 30% solution shows a pH-value of 5.0 to 5.5, a viscosity of 300 to 700 mPa.s and a flash point of about 50° C.

EXAMPLE 2

Raw materials:
 104.8 g dimethylaminoethylmethacrylate,
 27.7 g methacrylic acid,
 29.7 g dimethylaminoethanol,
 124.0 g dimethylmethanephosphonate and
 290.0 g $H_2O$.

Water is charged and dimethylaminoethylmethacrylate, methacrylic acid, dimethylaminoethanol and dimethylmethanephosphonate (temperature 33° C.) are added. Subsequently the mixture is healed to reflux under stirring (103° C.), kept at this temperature for 2 hours until the viscosity increases remarkably, then 380 g $H_2O$ are added. Following to this 4 ml 25% $Na_2S_2O_8$-solution are added at 60° C. under stirring, whereby no reaction can be noticed. Now the obtained condensation product is heated up to 80° C., kept at this temperature for 1 hour and then the batch cooled down and filtered. The obtained aqueous, cationic solution has a pH-value of 5.2, a viscosity of about 650 mPa.s and a solids content of about 30%.

EXAMPLE 3

Raw materials:
 21.6 g acrylic acid,
 26.7 g dimethylaminoethanol,
 188.7 g dimethylaminoethylmethacrylate,
 148.8 g dimethylmethanephosphonate,
 210.0 g ethanol and
 210.0 g $H_2O$.

Water and ethanol are charged, then acrylic acid, dimethylaminoethanol methacrylate and phosphonate are added successively, during this process a temperature of 32° C. and a pH-value of 8.6 result. After having heated to reflux (85° C.) and a reaction time of 4 hours the viscosity has increased to about 5000 mPa.s. Then 480 g water are added, the mixture cooled down to 60° C., brought to a subsequent reaction with 10 ml of a 25% $Na_2S_2O_8$-solution, heated up to 80° C. and kept at this temperature for 30 minutes. After that 360 g $H_2O$/ethanol-mixture (end temperature 98° C.) are distilled off. After having cooled down filtering auxiliary is added and the mixture filtered. The obtained cationic solution has a viscosity of 1900 mPa.s.

EXAMPLE 4

Example 1 is repeated while using a mixture of
 140 g toluene and
 140 g water.

After the addition of 560 g water (quantity B) all the toluene and 50 g water are distilled off up to 100° C. The completion is made as indicated in example 1 and an approx. 30%, aqueous solution of the condensation product is obtained. One can get similarly good condensation products if only 96 g dimethylmethanephosphonate are used.

EXAMPLE 5

Raw materials:
 90.0 g diethylaminoethylacrylate (formula I),
 377.4 g dimethylaminoethylmethacrylate (formula I),
 540.0 g diisopropylmethane phosphonate (formula II),
 520.0 g ethanol and
 520.0 g $H_2O$.

The reaction is carried out as described in example 3 (end viscosity prior to the addition of 2000 g diluting water: 650 mPa.s). 880 g alcohol/water-mixture are distilled off. The obtained cationic, aqueous solution has a solids content of about 32% and a pH-value of 5.2.

EXAMPLE 6

Example 5 is repeated and instead of the compounds of formulae (I) and (II) mentioned there
86 g dimethylaminoethyl acrylate,
398 g dimethylaminopropylmethacrylate and
372 g dimethylmethanephosphonate
are reacted under equal conditions (1750 g diluting water).

EXAMPLE 7

Raw materials:
103.3 g methacrylic acid,
106.8 g dimethylaminoethanol,
124.0 g dimethylmethanephosphonate and
280.0 g H$_2$O.

Water is charged, then
methacrylic acid,
dimethylamino ethanol (mixture turns reddish) and
dimethylmethanephosphonate
are added successively under stirring and heated up to reflux (102° C.). The mixture is kept at this temperature for 4 hours, then 370 g H$_2$O and 8 ml of a 25% Na$_2$S$_2$O$_8$-solution are added at 60° C. The batch is heated up to 80° C., kept at this temperature for another hour, cooled down and filtered.

The obtained anionic solution has a solids content of about 32% and a viscosity (at 20° C.) of 450 mPa.s.

EXAMPLE 8

Polyester taffeta (97 g/m$^2$) is padded with following baths:

(A) 40 g/l condensation product solution according to example 1 (according to invention) and
(B) 40 g/l of a 45% commercial antistatic agent (®ZEROSTAT EP of CIBA-GEIGY AG),
squeezed to a pick up of 40%, dried at 110° C. and crosslinked for 1 minute at 140° C. The following table shows the antistatic effects and their washing permanence:

|  | static charge (Rothshild ST-V-Meter) | | | | Measurement of surface resistance acc. to DIN 54345[1] | | Ash test[2] | |
|---|---|---|---|---|---|---|---|---|
|  | Voltage | | Half-life period in seconds | | | | | |
|  | OR | W | OR | W | OR | W | OR | W |
| Bath (A) acc. to invention | 0 | 1,3 | 0 | 4,0 | 8·10$^8$ | 1,00·10$^{10}$ | — | — |
| Bath (B) prior art | 1,0 | 3,3 | 1,2 | 7,0 | 5·10$^9$ | 1,25·10$^{10}$ | — | +− |
| untreated | 7,0 | — | >5 | — | 1,65·10$^{10}$ | — | ++ | / |

[1]at 20° C. and 60% air humidity.
[2]In the ash test the sample lying on a support of rubber is 10 times rubbed with a stick of hard rubber and the upper side of the sample is kept over cigarette ash (distance 1 cm). Now the pick-up of the ash is judged.
OR = original
W = after a 10 times' common 40° C. machine-washing with 5 g/l household detergent.

The application according to the invention is of a special advantage with regard to rubbing fastness. The dry rubbing fastness rates are better by 1.5–2 units, the wet rubbing fastness rates by 1–1.5 units (DIN 54102), compared with the prior art. For these tests the samples are crosslinked 1 minute at 180° C.

EXAMPLE 9

A red polyester woven fabric (about 184 g/m$^2$) dyed with 2.5% ®TERASIL red 3BL (*) is padded with baths (A) and (B) of example 8, squeezed to a pick up of 50%, dried for 10 minutes at 110° C. and crosslinked for 1 minute at 180° C. The water-fastness according to DIN 54006 is determined with the fabric finished in this way and showing very good antistatic effects. The sample is sewed into a test fabric (multifiber quality 10A). The following results are obtained on the different fabrics of the test fabric:

| Cellulose acetate | Wool | Polyacrylo-nitril | Polyester | Polyamide | Cotton |
|---|---|---|---|---|---|
| Bath (A) (according to invention) 3 | 3 | 4 | 3–4 | 2 | 3 |
| Bath (B) (prior art) 1 | 1 | 2 | 1–2 | 1 | 1–2 |
| untreated 4 | 4–5 | 4–5 | 4 | 3–4 | 4–5 |

*(CIBA-GEIGY AG)

We claim:

1. Process for the manufacture of an aqueous solution of a water-soluble, self-crosslinking condensation product which comprises reacting 1 mole of a compound of the formula (I)

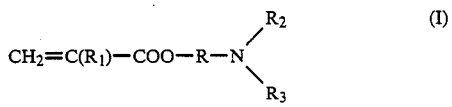

or the hydrolysis products thereof, in which R is alkylene with 2 to 4 C-atoms, R$_1$ is hydrogen or ethyl, and R$_2$ and R$_3$ are independently of each other an alkyl residue with 1 to 4 C-atoms,
with 0.3 to 1.5 mole of a compound of the formula (II)

in which R$_4$, R$_5$ and R$_6$ are independently of each other an alkyl residue with 1 to 3 C-atoms, by heating in the presence of water as reaction medium, wherein the viscosity is increased until nearly all the olefins double bonds have disappeared.

2. Process in accordance with claim 1, wherein the compounds of formula (I) and (II) are reacted until an increased viscosity of at least 500 millipascal-seconds for a 40 to 50% solution of the product is reached.

3. Process in accordance with claim 2, wherein, after having reached said increased viscosity, a polymerisation initiator is added with heating to react all olefinic double bonds.

4. Process in accordance with claim 1, wherein said reaction medium additionally comprises an organic solvent.

5. Process in accordance with claim 4, wherein the weight ratio of the sum of water and solvent to the sum of the compounds of formulae (I) and (II) is at the beginning of the reaction at least 1:1.

6. Process in accordance with claim 1, wherein said polar solvent is a monovalent alcohol with 1 to 4 C-atoms, a bi- or polyvalent alcohol with 1 to 4 C-atoms or a mono-, di- or poly-alkylether thereof having a molecular weight of at least 70 to about 200, each of which is at least partly water-soluble.

7. Process in accordance with claim 4, wherein said organic solvent comprises an alkyl-substituted benzene.

8. Process in accordance with claim 1, wherein said compound of formula (I) comprises at least partly dimethylaminoethylmethacrylate.

9. Process in accordance with claim 1, wherein said compound of formula (I) comprises a mixture of dimethylaminoethylacrylate and dimethylaminoethylmethacrylate.

10. Process in accordance with claim 1, wherein said compound of formula (II) comprises dimethylmethanephosphonate.

11. Process in accordance with claim 1, wherein said compounds of formula (I) are reacted at up to 100 mole % in the form of their hydrolysis products.

12. Process in accordance with claim 4, wherein said reaction medium additionally comprises a polar organic solvent.

13. Process in accordance with claim 11, wherein said compounds of formula (I) are reacted at up to 50 mmole % in the form of their hydrolysis products.

14. An aqueous solution of a water soluble, self-crosslinking condensation product prepared by reacting 1 mole of a compound of the formula (I)

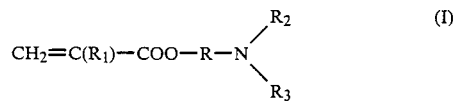

or the hydrolysis products thereof, in which R is alkylene with 2 to 4 C-atoms, $R_1$ is hydrogen or methyl, and $R_2$ and $R_3$ are independently of each other an alkyl residue with 1 to 4 C-atoms, with 0.3 to 1.5 mole of a compound of the formula (II)

in which $R_4$, $R_5$ and $R_6$ are independently of each other an alkyl residue with 1 to 3 C-atoms, by heating in the presence of water as reaction medium, wherein the viscosity is increased until nearly all the olefinic double bonds have disappeared.

15. An aqueous composition in accordance with claim 14, wherein the compounds of formulae (I) and (II) are reacted until a viscosity of at least 500 millipascal-seconds for a 40 to 50% solution of the product is reached.

16. An aqueous composition in accordance with claim 14, wherein after having reached said increased viscosity, a polymerisation initiator is added with heating to react all olefinic double bonds.

17. An aqueous composition in accordance with claim 14 which additionally comprises an organic solvent.

18. An aqueous composition in accordance with claim 18 which additionally comprises a polar organic solvent.

19. An aqueous composition in accordance with claim 17, wherein the weight ratio of the sum of water and solvent to the sum of the compounds of formulae (I) and (II) is at the beginning of the reaction at least 1:1.

20. An aqueous composition in accordance with claim 18, wherein said polar solvent is a monovalent alcohol with 1 to 4 C-atoms, a bi- or polyvalent alcohol with 1 to 4 C-atoms, or a mono-, di- or polyalkylether thereof having a molecular weight of at least 70 to about 200, each of which is at least partly water-soluble.

21. An aqueous composition in accordance with claim 17, wherein said organic solvent comprises an alkyl-substituted benzene.

22. An aqueous composition in accordance with claim 14, wherein said compound of formula (I) comprises at least partly dimethylaminoethylmethacrylate.

23. An aqueous composition in accordance with claim 22, wherein said compound of formula (I) comprises a mixture of dimethylaminoethylacrylate and dimethylaminoethylmethacrylate.

24. An aqueous composition in accordance with claim 14, wherein said compound of formula (II) comprises dimethylmethanephosphonate.

25. An aqueous composition in accordance with claim 14, wherein the compounds of formula (I) have been reacted at up to 100 mole % in the form of their hydrolysis products.

26. An aqueous composition in accordance with claim 14, wherein the compounds of formula (I) have been reacted at up to 50 mole % in the form of their hydrolysis products.

27. In a method of treating fiberous materials to apply a permanent antistatic finish thereto which comprises applying to said fiberous materials an aqueous self-crosslinking antistatic composition, the improvement which comprises applying to said fiberous material an aqueous solution of a self-crosslinking composition in accordance with claim 14.

* * * * *